Oct. 30, 1962 F. W. RAUER 3,061,794

DISTORTIONLESS ELECTRICAL AMPLIFIER

Filed Aug. 15, 1958 7 Sheets-Sheet 1

INVENTOR
Frank W. Rauer

BY
Mead, Browne, Schuyler and Beveridge
ATTORNEYS

Oct. 30, 1962 F. W. RAUER 3,061,794

DISTORTIONLESS ELECTRICAL AMPLIFIER

Filed Aug. 15, 1958 7 Sheets-Sheet 2

INVENTOR

Frank W. Rauer

BY

Mead, Browne, Schuyler and Beveridge

ATTORNEYS

INVENTOR
Frank W. Rauer

BY
Mead, Browne, Schuyler & Beveridge
ATTORNEYS

INVENTOR
Frank W. Rauer

BY
Mead, Browne, Schuyler and Beveridge
ATTORNEYS

DISTORTIONLESS ELECTRICAL AMPLIFIER

INVENTOR
Frank W. Rauer

BY
Mead, Browne, Schuyler & Beveridge
ATTORNEYS

Oct. 30, 1962 F. W. RAUER 3,061,794

DISTORTIONLESS ELECTRICAL AMPLIFIER

Filed Aug. 15, 1958 7 Sheets-Sheet 6

INVENTOR

Frank W. Rauer

BY

Mead, Browne, Schuyler and Beveridge

ATTORNEYS

DISTORTIONLESS ELECTRICAL AMPLIFIER

Filed Aug. 15, 1958 7 Sheets-Sheet 7

INVENTOR
Frank W. Rauer

BY
Mead, Browne, Schuyler & Burridge
ATTORNEYS

United States Patent Office 3,061,794

Patented Oct. 30, 1962

3,061,794

DISTORTIONLESS ELECTRICAL AMPLIFIER

Frank W. Rauer, 4144 Marvin Ave., Cleveland, Ohio

Filed Aug. 15, 1958, Ser. No. 755,334
8 Claims. (Cl. 330—148)

This invention relates to amplifiers of electrical energy and is directed to the problem of providing an amplifier which is capable of reproducing faithfully, in amplified form at the output of the amplifier, information fed into the input of the amplifier.

In order that the output of an amplifier will be a faithful reproduction of the input to the amplifier, it is necessary to avoid distortion of the input information while it is being amplified. While much work has been done in the field of electrical amplifiers in an effort to eliminate distortion, the work done to date has not, to my knowledge, solved the problem in an economical and practical manner. In the field of audio-amplification, audio-amplifiers with which I am familiar create noticeable distortion during operation of the amplifier whereby there is a recognizable difference in tone quality, for example, between the audio-input and the audio-output. High fidelity systems have been developed which admittedly go far toward solution of the problem but such systems generally involve costly and complex amplifiers and multiple speakers to obtain multiple acoustical outputs which are blended in an effort to simulate the original. Such systems are complicated and hence relatively expensive as compared to amplifiers according to the present invention.

In the field of amplifiers for high frequency electrical oscillations, such as radio frequency amplifiers and video amplifiers, amplifiers known to me introduce objectionable phase distortion and the like during operation of the amplifier whereby the output is distorted as compared to the input. Again, much work has been done in this field to achieve faithful reproduction of the input information but, to my knowledge, the problem has not been solved in an economical and practical manner.

It is therefore an object of the present invention to provide new and improved electrical amplifiers which are relatively inexpensive but which nevertheless effectively amplify information fed into the amplifier without distorting the information.

It is another object of the present invention to provide such amplifiers wherein, in effect, a single amplifier operates as a plurality of amplifiers.

It is a further object of the present invention to provide such amplifiers including an electron tube or the like wherein output information is extracted, in effect, from within the center of the electron field or fields created within the tube.

It is still another object of the present invention to provide such amplifiers wherein distortion created by the space charge existing within the electron field or fields created within the tube is effectively eliminated.

It is still another object of the present invention to provide a new and improved audio-amplifier wherein the tone quality of the amplifier output is a faithful reproduction of the tone quality of the amplifier input.

It is still another object of the present invention to provide a new and improved video amplifier wherein phase distortion during amplification is effectively eliminated and the video output is a faithful reproduction of the video input.

It is a still further object of the present invention to provide a new and improved adapter for converting a conventional amplifier circuit to an amplifier circuit according to the present invention.

Briefly described, a preferred embodiment of an electrical amplifier according to the present invention includes an electron tube having a thermionic emitter or cathode electrode, an anode electrode, and three grids located between the anode and cathode. These grids are a control grid, located closest to the cathode, an outer grid, located closest to the anode, and a middle grid, located between the control grid and the outer grid. The amplifier input circuit includes the control grid and the cathode. The electrical magnitude of the input signals is such that the control grid is very close in potential to the potential of the cathode at the peak of signal input.

The output circuit of the amplifier includes the middle grid, outer grid, anode and cathode. A B+ source is connected to the middle grid, outer grid, and anode, all of which have a positive potential applied thereto during operation of the amplifier. Suitable resistors are connected between the B+ source and each output element and, in the case of the middle grid and the anode, a mutual load sharing resistor is provided. One side of the output circuit is taken directly from the outer grid whereby output information is extracted, so to speak, from the center of the electron field or fields created within the tube.

The middle grid, outer grid, and anode being located in the relation described, and each having a positive electrical potential applied thereto during operation of the amplifier, I find that I obtain in effect a plurality of amplifiers in a single electron tube. Thus, the middle grid and anode appear to act as an amplifier to provide an amplifier output while, at the same time, the outer grid appears to act as an amplifier and provide an amplifier output. The outer grid, being physically located between the anode and middle grid, appears to function as a virtual midtap of the anode, thus apparently extracting information from within the center of the electron field or fields created within the tube. Moreover, the space charge distortion which exists when a conventional pentode is used as an amplifier is apparently effectively eliminated by connecting the tube elements in the manner described and applying electrical potentials to them in the manner described.

Whatever interaction occurs among the electrical fields created by the middle grid, outer grid, and anode appears to produce a resultant dynamic field which has a dimension, or depth, such that it can accommodate wave forms of the input information and reproduce them, in amplified form, without noticeable distortion. The amplifier may be driven heavily and operate throughout a substantially wide frequency range for the particular application involved. I have found in practice that utilization of a preferred embodiment of my invention as just described provides faithful reproduction of audio frequency with a depth, clarity and brilliance matching the original sound and, in video reproduction, provides images which are sharp and clearly defined, with full gradation from black to white and with the apparent illusion of depth.

Other objects and advantages of my invention will become more apparent from the following detailed description, taken in conjunction with the attached drawings, in which:

FIG. 1 is a circuit diagram of an amplifier according to the present invention;

FIG. 1*a* shows the circuit diagram of FIG. 1 separated to illustrate how plural amplifiers are provided by a single tube;

Figure 1:
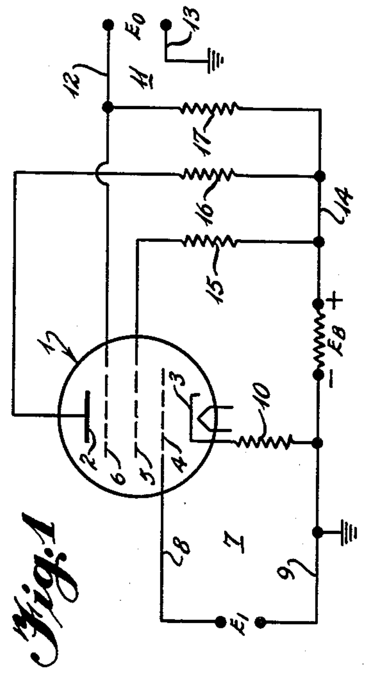

Referring to the drawings, and to FIG. 1 in particular, an amplifier according to the present invention is shown as including a thermionic valve or electron tube designated generally by the reference numeral 1 and having an anode electrode 2 and a cathode electrode 3. Three grids are located between anode 2 and cathode 3, these being a control grid 4, a middle grid 5, and an outer grid 6. Control grid 4 is located closest to cathode 3, outer grid 6 is located closest to anode 2, and middle grid 5 is located between control grid 4 and outer grid 6.

The structure thus far described will be recognized by those skilled in the art as being that of a conventional pentode tube with middle grid 5 corresponding in location to the screen grid of a pentode, and outer grid 6 corresponding in location to that of the suppressor grid of a pentode tube. However, while there is this structural similarity to a conventional pentode tube, the manner in which middle grid 5 and outer grid 6 are connected with respect to other elements of tube 1 differ considerably from conventional pentode screen grid and suppressor grid connections as will be more evident from the description given hereinafter.

The input circuit to the amplifier shown in FIG. 1 is designated generally by the reference numeral 7 and includes lead 8 connected to control grid 4, and lead 9 connected to $-E_B$. Bias resistor 10 is connected between cathode 3 and lead 9 whereby a suitable bias potential is applied to the cathode during operation of the amplifier. The input information or signals ($E_I$) are applied across leads 8 and 9 as indicated in FIG. 1 and it is apparent that the input circuit 7 includes cathode 3 and control grid 4. During operation of the amplifier, the magnitude of the input signals is such that control grid 4 has an electrical potential at the signal peaks, which is very close to the potential of cathode 3.

The output circuit of the amplifier shown in FIG. 1 is indicated generally by the reference numeral 11 and includes lead 12 which comes directly from outer grid 6 and lead 13 which is connected, through ground, to negative potential lead 9. Positive potential lead 14, coming from $+E_B$ (as shown in FIG. 1) is connected through resistor 15 to middle grid 5, through resistor 16 to anode or plate 2, and through resistor 17 to outer grid 6. It is therefore apparent that the middle grid, outer grid, and plate all have a positive electrical potential applied thereto and that the magnitude of the potential will depend upon the magnitude of $E_B$ and the respective values of resistors 10, 15, 16 and 17. Middle grid 5, outer grid 6, and plate 2 thus all function as output elements of the amplifier with the signals of the ultimate output ($E_O$) appearing on lead 12 which accordingly may be considered as forming one side of the output circuit. Cathode 3, of course, also functions as an element of the output circuit 11 since the cathode is connected, through resistor 10 and ground, to output lead 13.

Figure 1A:
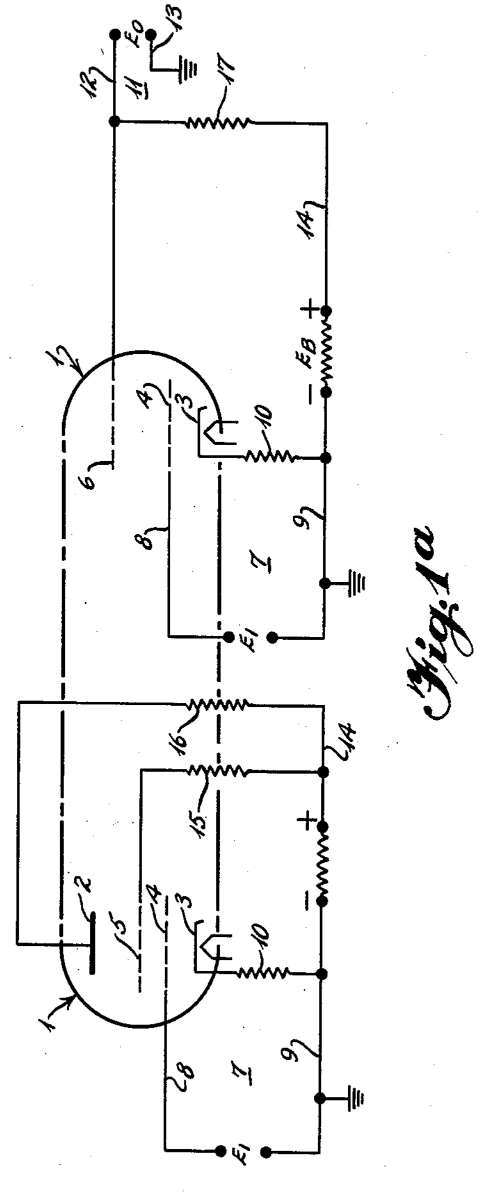

Reference to FIG. 1*a* shows that the amplifier of FIG. 1 is actually a plurality of amplifiers in the sense that plural outputs are obtained from a single tube. Thus, in FIG. 1*a*, the left-hand portion shows one amplifier as having an output circuit including middle grid 5 and plate 2, and the right-hand portion shows another amplifier as having an output circuit including outer grid 6. In fact, the left-hand portion of FIG. 1*a* could be further subdivided to show one output circuit as including middle grid 5 and another output circuit as including plate 2, thus making a total of three amplifiers.

As shown in FIG. 1, outer grid 6 is located between middle grid 5 and plate 2. By selecting suitable values for resistors 15 and 16, in relation to $E_B$, the plus potentials applied to middle grid 5 and plate 2 can be made such as to cause both elements to function as twin anodes but spaced apart from each other as indicated in FIGS. 1 and 1*a*. Since outer grid 6 is located between middle grid 5 and plate 2, the outer grid can extract output information from what can be described as the center of the electron field or fields created within the tube, insofar as middle grid and plate 2 are concerned. If these elements are considered as twin anodes, in effect, then outer grid 6 can be considered as a virtual midtap of the anode.

Whatever description may be given to the middle grid, outer grid, and plate insofar as midtap designations and the like are concerned, it appears that there is a substantial elimination of any space charge resulting from secondary emission from plate 2 and that there is a turbulance or interaction among the fields produced by the middle grid, outer grid, and plate, which results in a shifting of what particular element is acting as the primary element at any given time. The electron field action is such that the elements appear to pick up information in depth and the output therefore has a clarity, brilliance and range of depth which is an image of such factors as they appeared in the input.

Figure 2:
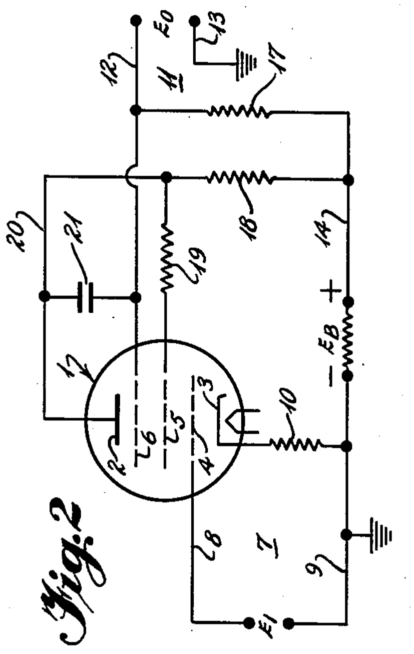
FIGS. 2–11 are circuit diagrams of modifications of the amplifier shown in FIG. 1.

FIG. 2 shows a modification of the amplifier of FIG. 1 in which the middle grid and plate have a common load resistor. With the same reference numbers being used to designate elements in FIG. 2 which correspond to like elements in FIG. 1, it will be noted that resistor 18 is connected between positive potential lead 14 and both plate 2 and middle grid 5. Resistor 18 is thus common to both of these output circuit elements.

The amplifier shown in FIG. 2 differs further from the amplifier shown in FIG. 1 in that a resistor 19 is connected between middle grid 5 and plate lead 20. Additionally, the capacitor 21 is connected across output circuit lead 12 and plate lead 20. The inclusion of capacitor 21 in the amplifier circuit shown in FIG. 2 is optional, the capacitor being used to obtain tone compensation when, for example, the amplifier is being used as an audio amplifier.

Solely by way of example, an amplifier constructed in accordance with the circuit diagram of FIG. 2 embodied impedance components having the following values, tube 1 being of a type known to those skilled in the art by the designation 12AU6:

| | |
|---|---|
| Resistor **10** | 1500 ohms. |
| Resistor **17** | 470K(K=1,000 ohms). |
| Resistor **18** | 100K. |
| Resistor **19** | 100K. |
| Capacitor **21** | .001 mfd. |

The foregoing exemplary values are, of course, interrelated and, in turn, depend upon such factors as the bias potential, the strength and frequency of the incoming signals, and how much gain is desired and can be obtained without distortion throughout a reasonable frequency range. With such values, the A.C. potential of the plural amplifiers (plate, middle grid and outer grid) are found to be substantially equal. The bias potential is naturally affected by the impedance of the bias potential source itself. In the case of a rectifier to which 110 volts are applied, $+E_B$ will be in the range from 90–100 volts.

As has been previously mentioned, control grid 4 is operated at a potential very close to that of cathode 3. Thus, the $E_I$ strength and frequency can be 1.5 volts at 1,000 cycles in the case of audio amplification. With this input signal strength, a load resistor 17 of 470K provides a voltage gain of roughly from 5 to 6 or, in other words, an $E_O$ from 7.5 volts to 9 volts. Varying the value of resistor 17, with other impedance components being kept in proper balance, varies the gain of the amplifier circuit.

Figure 3:
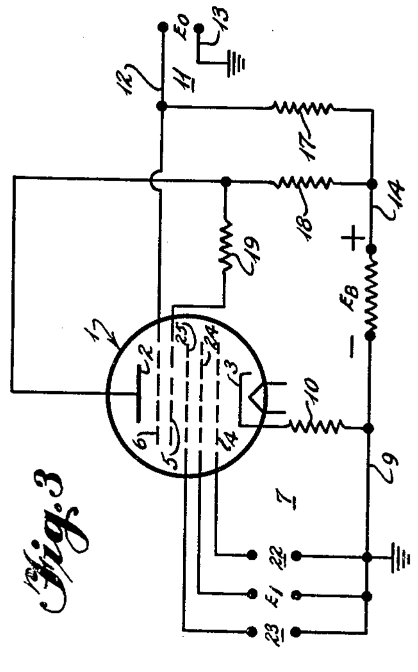

FIG. 3 shows a modification of the amplifier shown in FIG. 2 (with capacitor 21 being omitted) wherein there are plural input circuits to the amplifier. Thus, in FIG. 3, there are input circuits designated generally by the reference numerals 7, 22 and 23. Each input circuit includes cathode 3 and a control grid. As shown in FIG. 3, input circuit 7 includes cathode 3 and control grid 4. Input circuit 22 includes cathode 3 and control grid 24. Input circuit 23 includes cathode 3 and control grid 25. An amplifier constructed in accordance with the circuit diagram of FIG. 3 processes plural input information and, as explained above in connection with FIG. 1*a*, provides, in effect, plural output signals from a single tube. Furthermore, the plural inputs can be variable thereby providing electronic mixing.

Figure 4:
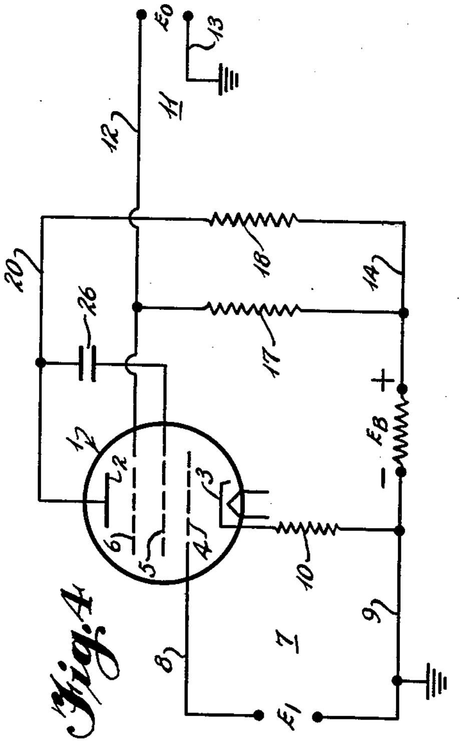

In the amplifier circuit shown in FIG. 4, instead of having resistor 19 connected between middle grid 5 and plate lead 20, a capacitor 26 is connected between the middle grid and plate lead 20. Otherwise, the amplifier of FIG. 4 is similar to that shown in FIG. 2 (with capacitor 21 being omitted) and has been found to operate satisfactorily in accordance with the teaching of the present invention.

Figure 5:
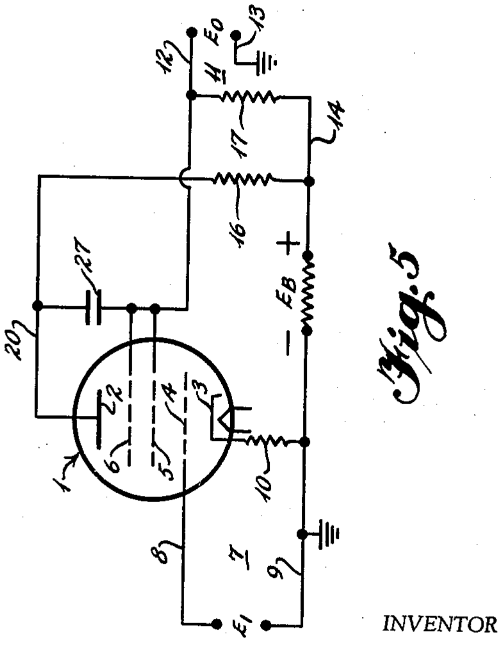

In the amplifier according to FIG. 5, both the middle grid 5 and outer grid 6 are connected directly to output lead 12. In addition, a capacitor 27 is connected between both the middle grid and the outer grid, and plate 20.

Figure 6:
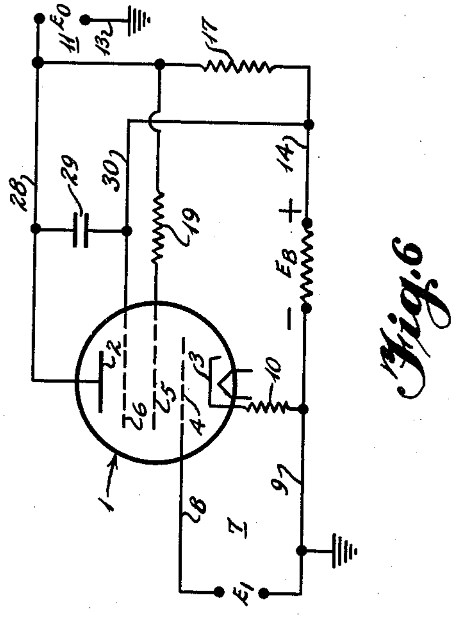

In the amplifier according to FIG. 6, a lead from the plate forms one side of the output circuit, and the outer grid is tied to this lead by a capacitor. Thus, output lead 28 is connected directly to plate 2 and outer grid 6 is connected to lead 28 via capacitor 29. Also, the outer grid is connected directly to positive potential lead 14 by lead 30.

Figure 7:
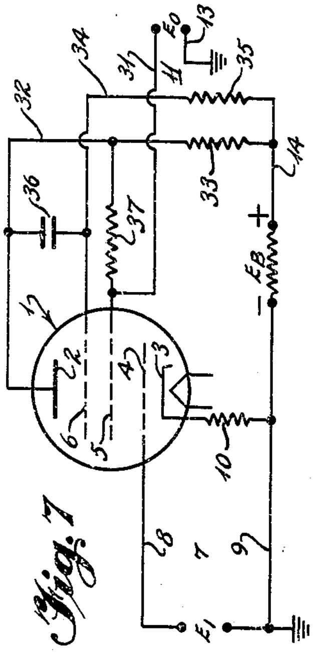

In the amplifier according to FIG. 7, the lead forming one side of the output circuit is connected directly to middle grid 5 instead of extending directly from outer grid 6. Thus, referring to FIG. 7, lead 31 is shown as coming from middle grid 5. Plate 2 is connected to positive potential lead 14 via lead 32 and resistor 33. Outer grid 6 is connected to positive potential lead 14 via lead 34 and resistor 35. Capacitor 36 is connected across leads 32 and 34, and resistor 37 is connected between middle grid 5 and lead 32. In this circuit arrangement, it is to be noted that the middle grid, outer grid and plate still at function as output elements, the outer grid being tied to the middle grid via the resistors and capacitor 36, and the plate being tied to the middle grid via resistor 37.

Figure 8:
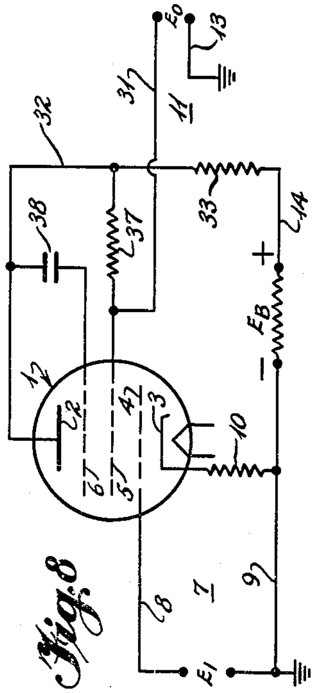

While similar to the FIG. 7 amplifier in that output circuit lead 31 is connected directly to middle grid 5, the amplifier shown in FIG. 8 differs from the FIG. 7 amplifier in that resistor 35 (see FIG. 7) is omitted from the FIG. 8 circuit. Thus, in the FIG. 8 circuit, outer grid 6 is tied directly to plate lead 32 by capacitor 38. Plate lead 32 is connected to positive potential lead 14 via resistor 33, and middle grid 5 is connected to plate lead 32 via resistor 37, as in the FIG. 7 circuit.

Figure 9:
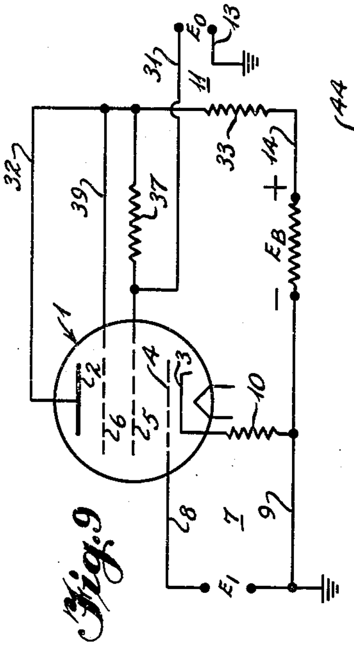

The amplifier according to FIG. 9 is similar to the amplifier shown in FIG. 8 with the exception that, in FIG. 9, the outer grid and plate are tied together. Thus, referring to FIG. 9, the outer grid 6 is connected directly to plate lead 32 by lead 39, thus omitting capacitor 38 shown in FIG. 8. Of course, interelectrode capacitance exists between outer grid 6 and plate 2.

Figure 10:
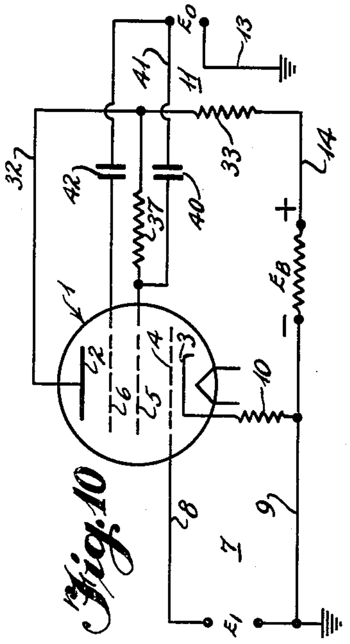

In the amplifier circuit shown in FIG. 10, a capacitor 40 is connected between middle grid 5 and output circuit lead 41. Likewise, a capacitor 42 is connected between outer grid 6 and output circuit lead 41. Thus, both the middle grid and the outer grid are connected to one side of the output circuit through capacitors. Resistor 37 is connected between middle grid 5 and plate lead 32. As in FIGS. 7–9, plate 2 and middle grid 5 share the common load resistor 33 shown in FIG. 10.

Figure 11:
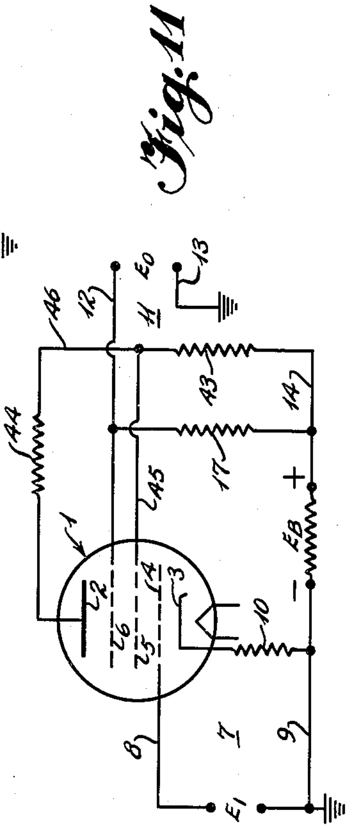

The amplifier circuit shown in FIG. 11 is generally similar to the circuit shown in FIGS. 2 and 4. Thus, referring to the FIG. 11 circuit, it is noted that output circuit lead 12 extends directly from outer grid 6. Resistors 43 and 44 are connected in series between plate 2 and positive potential lead 14. Middle grid 5 is connected, via lead 45, to lead 46 which connects resistors 43 and 44 in series. With this arrangement, it is apparent that load resistor 43 is common to plate 2 and middle grid 5. Load resistor 17 is connected between output circuit lead 12 and positive potential lead 14. Plate 2, middle grid 5 and outer grid 6 all have positive potentials applied thereto and thus all function as elements of the output circuit 11. Furthermore, as in the circuit shown in FIGS. 1 and 2, for example, the output lead 12 comes from an element (outer grid 6) which is located between what can be considered as being, in effect, twin anodes (plate 2 and middle grid 5).

Figure 12:
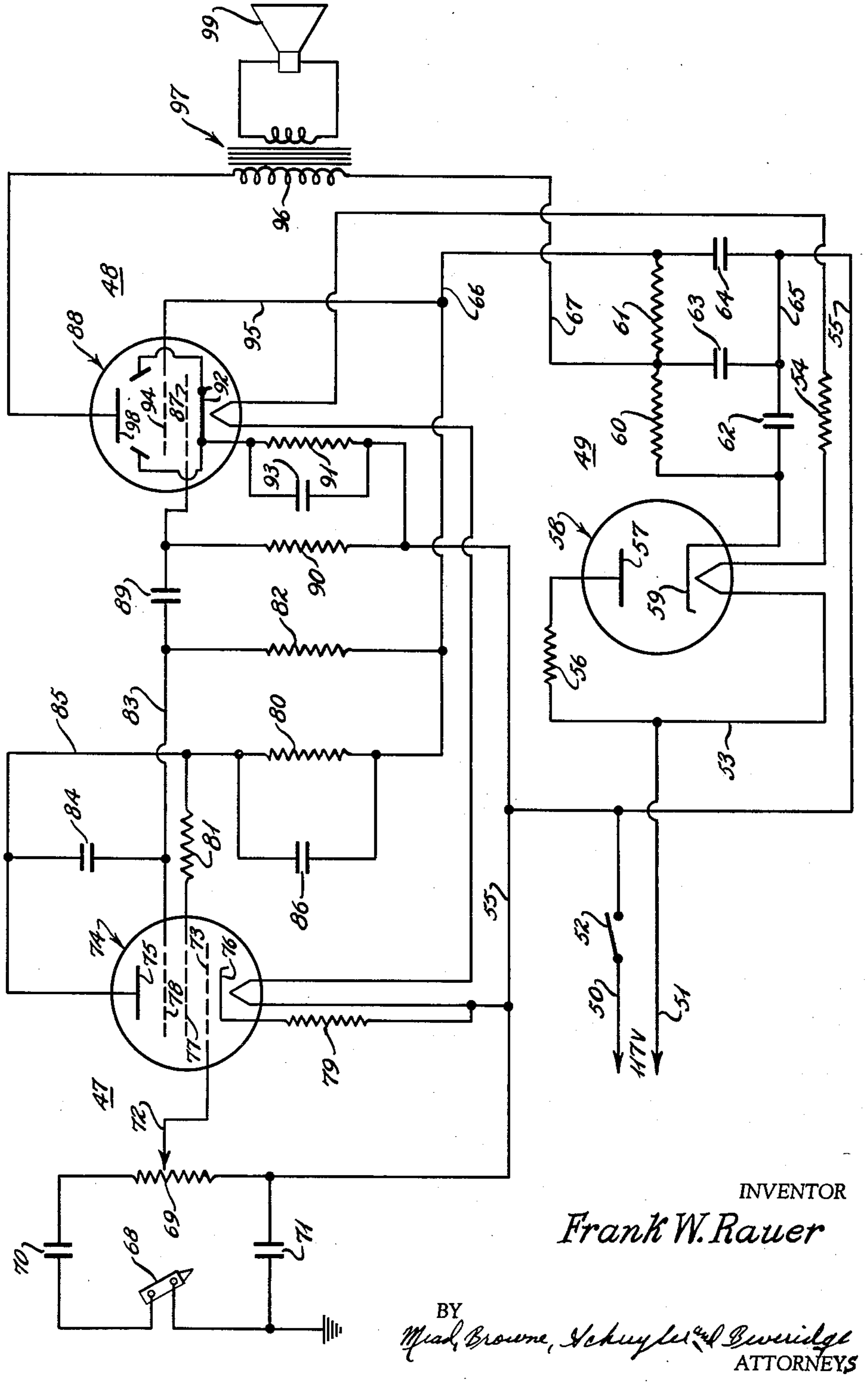
FIG. 12 is a circuit diagram of a two-stage audio amplifier including an amplifier according to the present invention.

As has been stated above, amplifiers according to the present invention (the circuits shown in FIGS. 1–11 being exemplary) have been found to provide substantially distortionless amplification in both audio and video applications. FIG. 12 is a circuit diagram of a three tube series circuit amplifier for phonographs embodying an input stage amplifier constructed in accordance with the teaching of the present invention.

Referring more specifically to FIG. 12, the circuit shown there is seen to include an input stage designated generally by the reference numeral 47, an output stage designated generally by the reference numeral 48, and a power supply designed generally by the reference numeral 49. Alternating current power input to the power supply is applied across a pair of leads 50 and 51, with switch 52 being provided to break the power circuit when desired. The A.C. voltage applied may be the usual voltage available for household use, 115 volts being an example. Lead 53 is connected to power lead 51 and supplies heater current to the filament or cathode heaters of the three tubes involved, these heaters being connected in series with each other as shown in FIG. 12. A resistor 54 is connected in the heater circuit and may have a value of 125 ohms. Also, as shown in FIG. 12, the heater circuit is completed to B— lead 55.

Power lead 51 is connected through resistor 56 to anode or plate 57 of rectifier tube 58. Filament or cathode 59 of tube 58 is connected to a voltage dropping or divider circuit including resistors 60 and 61, and capacitors 62, 63 and 64 connected as shown in FIG. 12. B— lead 55 is connected to and extends from lead 65 which is common to one side of each of the capacitors 62, 63 and 64, as shown in FIG. 12. B+, or positive potential, lead 66 is connected to one end of resistor 61 while B+, or positive potential, lead 67, is connected between resistors 60 and 61, as shown in FIG. 12.

Consistent with other values mentioned hereinafter, and solely by way of example, power supply components may have the following values (where tube 58 is of a type known to those skilled in the art by the designation 35W4):

| | | |
|---|---|---|
| Resistor **56** | ohms | 33 |
| Resistor **60** | do | 330 |
| Resistor **61** | do | 1,000 |
| Capacitor **62** | mfd | 40 |
| Capacitor **63** | mfd | 40 |
| Capacitor **64** | mfd | 20 |

Referring now to the input stage 47, this stage is seen to include a phonograph pickup 68 which may be of the type incorporating known ceramic or crystal cartridges for reproduction from phonograph records. A potentiometer 69 is connected across pickup 68 with capacitors 70 and 71 interposed between the ends of the potentiometer and pickup 68 as shown in FIG. 12. One side of pickup 68 is grounded and one end of potentiometer is connected to B— lead 55.

Input signals from the pickup circuit which includes phonograph pickup 68 are applied, via adjustable lead 72, to control grid 73 of a vacuum tube 74. Before proceeding further with a description of the input stage amplifier including tube 74, it is pointed out that this portion of the circuit is an embodiment of the FIG. 2 circuit shown and described above.

Thus, tube 74 includes an anode or plate 75, a filament or cathode 76, a middle grid 77, and an outer grid 78 which correspond in structure and function to like elements shown in the FIG. 2 circuit. Negative potential bias is applied to cathode 76 from B— lead 55 via bias resistor 79. B+ or positive potential is applied to plate 75 from B+ lead 66 via resistor 80, to middle grid 77 via resistors 80 and 81, and to outer grid 78 via resistor 82. Again, the similarity to the FIG. 2 circuit will be noted.

Output lead 83 is connected to and extends directly from outer grid 78. A capacitor 84 is connected between output lead 83 and plate lead 85 while a capacitor 86 is connected in shunt or parallel relation to resistor 80. Capacitors 84 and 86 may be omitted without substantially affecting the operation of the input stage amplifier. However, their inclusion in the circuit is required to provide improved frequency reproduction when the amplifier is used with a phonograph pickup incorporating ceramic or crystal cartridges known to those skilled in the art. By utilizing the capacitors, it is possible to obtain improved correspondence with the recording curve used in making the record.

Output signals from the input stage amplifier are applied to the control grid 87 of tube 88 of output stage 48, via coupling condenser 89. A bias resistor 90, connected to control grid 87, and a bias resistor 91, connected to cathode 92, are both connected to B— lead 55 as shown in FIG. 12. A capacitor 93 is connected in parallel with resistor 91. Screen grid 94 is connected by lead 95 to B+ or positive potential lead 66. Primary winding 96 of transformer 97 is connected between plate 98 and B+ or positive potential lead 67 as shown in FIG. 12.

With components of the output stage 48 connected as described, and as will be understood by those skilled in the art, output stage amplifier tube 88 will amplify the signals fed from input stage 47 via lead 83 and capacitor 89, the amplified output appearing across primary winding 96 to thereby drive speaker 99.

Solely by way of example, and keeping in mind component values given above in connection with the power supply components, components of input stage 47 of the amplifier circuit shown in FIG. 12 may have the following values (with tube 74 being of a type known to those skilled in the art by the designation 12AU6):

| | | |
|---|---|---|
| Capacitor **70** | mfd | .005 |
| Capacitor **71** | mfd | .25 |
| Capacitor **84** | mfd | .001 |
| Capacitor **86** | mfd | .01 |
| Resistor **69** | megohm | 1 |
| Resistor **79** | ohms | 1800 |
| Resistor **81** | | 100K |
| Resistor **80** | | 100K |
| Resistor **82** | | 470K |

If capacitors 84 and 86 are omitted, heavier use may be made of the internal capacities of tube 74 if resistors 79, 80 and 81 have the following values, by way of example:

| | |
|---|---|
| Resistor **79** | 5K |
| Resistor **80** | 100K |
| Resistor **81** | 470K |

Keeping in mind the values mentioned above in connection with both the power supply components and input stage components, components of the output stage 48 may have the following values (tube 88 being of a type known to those skilled in the art by the designation 50C5):

| | | |
|---|---|---|
| Capacitor **89** | mfd | .01 |
| Capacitor **93** | mfd | 25 |
| Resistor **90** | | 500K |
| Resistor **91** | ohms | 150 |
| Resistor **96** | ohms | 2500 |

With an alternating current voltage of 115–120 volts applied across power input leads 50 and 51 (117 volts being an example) the following D.C. voltages exist at the following designated input stage amplifier stage 74:

| | Volts |
|---|---|
| Plate **75** | 46–52 |
| Outer grid **78** | 23–28 |
| Middle grid **77** | 32–36 |
| Cathode **76** | 1 |

In addition, the output of pickup 68 is in the range from .5 to 1 volt. With this output from the phonograph pickup and with components of the entire circuit of FIG. 12 having exemplary values as mentioned above, it was found that speaker 99 faithfully reproduced the recorded music or the like with a clarity, brilliance, and range of depth considered by me to be a susbtantial improvement over phonograph amplifiers known to me prior to my invention. Moreover, as will be appreciated by those skilled in the art, the circuitry involved illustrated in FIG. 12 is economical and practical for the results obtained.

Figure 13:
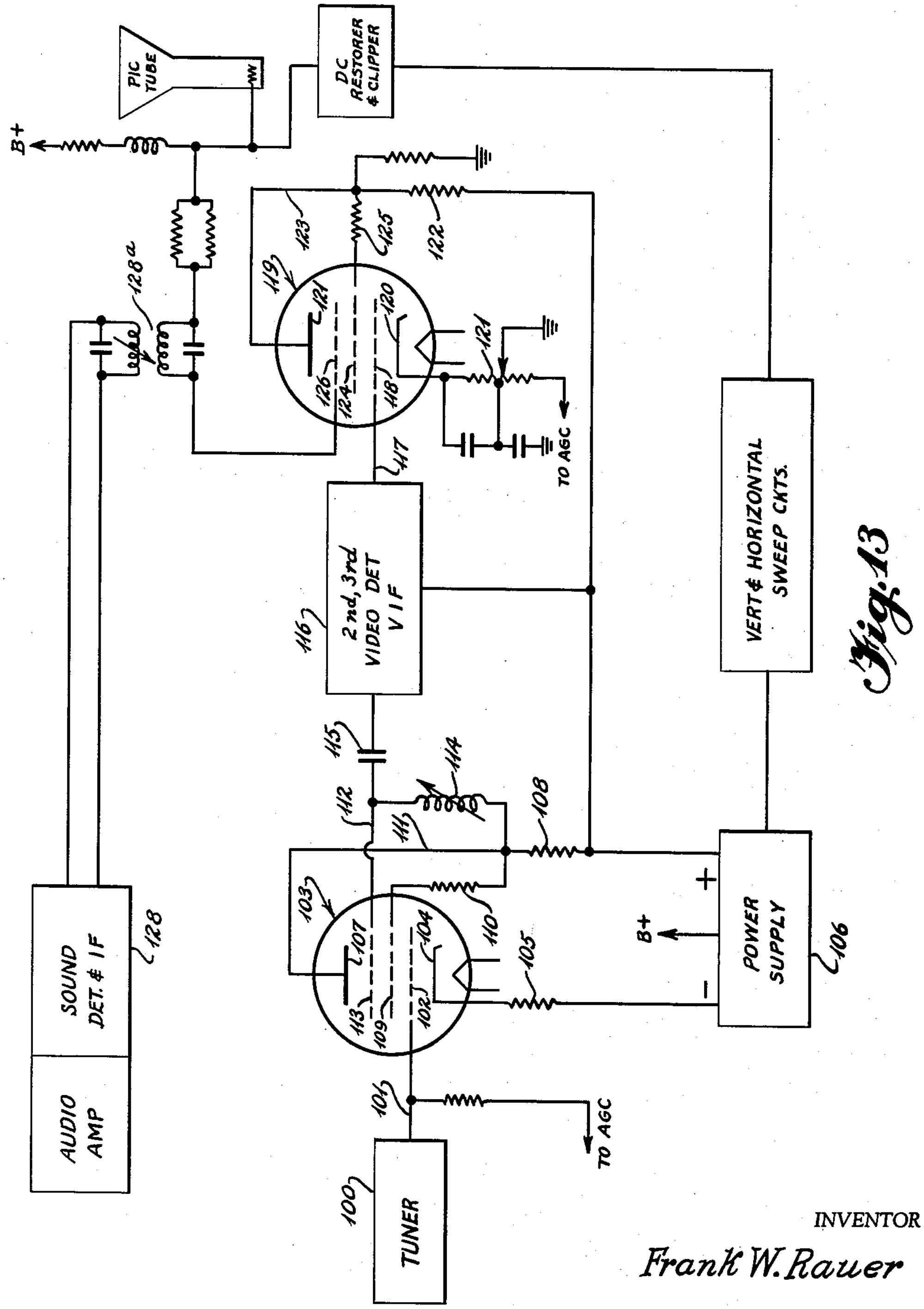
FIG. 13 is a circuit diagram, partly in block form, of a television receiver including amplifiers according to the present invention.
Figure 18:
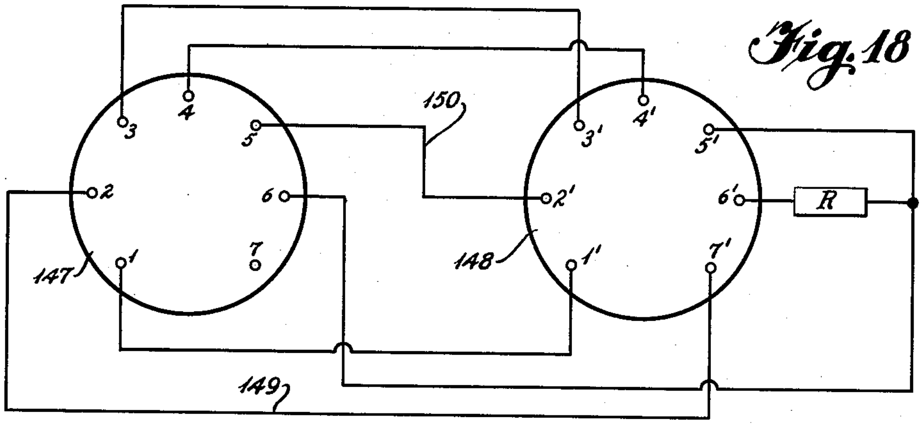
FIG. 18 is a wiring diagram showing an adaptor for use in going from a tube basing diagram of one type in the receiver set to a tube basing diagram of a different type at the socket of the adaptor.

FIG. 13 shows amplifiers according to the present invention incorporated in a television receiver circuit. Such amplifiers are preferably incorporated in one of the video IF stages and in the video amplifier stage of a conventional intercarrier type television receiver circuit. However, substantial improvement in picture clarity is noted if such an amplifier is incorporated only in one of the video IF stages. The frequency range in such a stage may be up to 41 megacycles.

Because the television receiver circuit is otherwise conventional, FIG. 13 is a block diagram with respect to conventional parts, the amplifiers according to the present invention being shown in circuit diagram as they are connected with respect to conventional components. Thus, referring more particularly to FIG. 13, the reference numeral 100 designates a conventional tuner circuit for an intercarrier type television receiver having an output lead 101 which is connected to control grid 102 of an electronic tube designated generally by the reference numeral 103. Tube 103 is in the first video IF stage and the circuit arrangements are such that it replaces the conventional pentode used in this stage. Furthermore, it will be noted that the circuitry of tube 103 is essentially similar to that illustrated and described above is connected with FIG. 2.

Cathode 104 of tube 103 is connected, through biasing resistor 105, to the negative potential, or B—, side of the power supply circuit indicated by the block 106. Plate 107 is connected, through load resistor 108, to the positive potential, or B+, side of power supply 106.

Middle grid 109 is connected, through resistor 110, to plate lead 111 whereby resistor 108 is a common load resistor insofar as plate 107 and middle grid 109 are concerned. Output lead 112 is connected directly to outer grid 113 and is connected to the B+ side of power supply 106 through variable inductance 114 and resistor 108.

With the connections described, it is evident that B+, or positive, potential is applied to plate 107, middle grid 109, and outer grid 113 whereby all of these elements can function as output elements of the amplifier circuit. Moreover, the output signals are taken from a virtual midtap of the anode circuitry of tube 103 since outer grid 113 is located between plate 107 and middle grid 109, the latter functioning in effect as twin anodes. The output signals appearing on lead 112 are fed, through a coupling capacitor 115, to the second video IF stage. Since, in the television receiver circuit shown in FIG. 13, the second video IF stage, the third video IF stage, and the video detector stage are all conventional, they are represented collectively by the block 116.

Output lead 117, coming from the video detector, is connected to control grid 118 of an electronic tube designated generally by the reference numeral 119. Tube 119 is incorporated in the video amplifier stage and outputs from this stage go to the audio and picture tube portions of the television receiver circuit as illustrated in FIG. 13.

Cathode 120 of tube 119 is connected, through adjustable biasing resistor 121 and ground, to the negative potential, or B—, side of power supply 106. Plate 121 is connected, through load resistor 122 and plate lead 123, to the positive potential, or B+, side of power supply 106. Middle grid 124 is connected, through resistor 125, to plate lead 123. Thus, both plate 119 and middle grid 124 share load resistor 122. Outer grid 126 is connected to the conventional audio circuits by inductive means, as shown in FIG. 13, and positive (B+) potential is applied to outer grid 126 through these circuits.

From the circuit connections described in relation to tube 119, it is apparent that plate 121, middle grid 124, and outer grid 126 all function as output elements of the amplifier circuit. The output signal of the plural amplifiers (plate 121 and grids 124 and 126) goes to the control grid of the picture tube 127 through the primary winding 128a of the sound take-off trap shown in FIG. 13.

Referring back to the first video IF stage incorporating tube 103 (which may be of a type known to those skilled in the art by the designation 6AU6 but with changed connections as indicated), if the B+ potential applied to plate 107, middle grid 109 and outer grid 113 is approximately 140 volts, then cathode biasing resistor 105 may suitably have a value of approximately 80 ohms, resistor 110 may have a value of 100 ohms, and resistors 108 and 110 may suitably have a value of 100 ohms.

In order that an amplifier circuit according to the present invention may be incorporated in a video IF stage of a conventional television receiver circuit without actually rewiring the stage to provide circuit connections such as those shown in relation to tube 103 in FIG. 13, it is another feature of the present invention to provide a plug-in adaptor whereby a conventional pentode tube may be used, in conjunction with the adaptor, of course, and still the circuit connections will be as shown in connection with tube 103 of FIG. 13. An embodiment of such an adaptor is shown (in assembled relation) in FIG. 14. FIG. 15 shows the adaptor with the cover and insulating filling omitted so that internal wiring of the adaptor is exposed.

Figure 14:
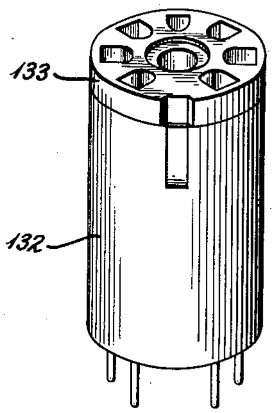
FIG. 14 shows an adaptor adapted to be plugged into a conventional pentode stage of a receiver set whereby, when a conventional pentode is plugged into the adaptor socket, the tube will have connections in accordance with the teaching of the present invention.
Figure 15:
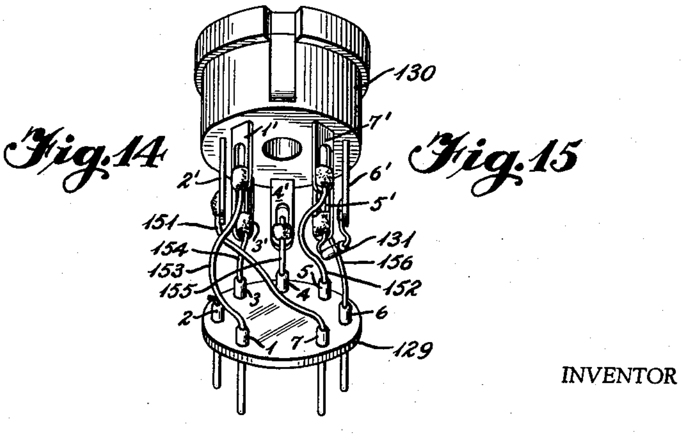
FIG. 15 is a view of the adaptor shown in FIG. 14 with the outer casing and insulating filling omitted to expose the internal wiring of the adaptor.

Structurally, the adaptor shown in FIGS. 14 and 15 comprises a plug 129, and a socket 130. Both the plug and the socket are preferably for seven pin miniature type tubes but, as will be appreciated by those skilled in the art, eight pin types could be constructed if desired.

The respective plug and socket terminals are connected in accordance with wiring diagrams shown in FIGS. 16–19 and described more in detail hereinafter. One of the connections includes a resistor 131 shown in FIG. 15.

After the plug and socket terminals have been connected together in accordance with the applicable wiring diagram, a sleeve 132 is assembled to the plug and socket by sliding the sleeve over the wired assembly. The sleeve is bonded to the plug by suitable means, not shown, and then the entire inside of the adaptor is encapsulated with a suitable material (not shown in FIGS. 14 and 15) which insulates the wiring and gives rigidity to the assembly. An epoxy resin may be used as the encapsulating material since this resin has excellent electrical properties and does not add further capacity to the unit. When the assembly is completed, sleeve 32 covers the rim of plug 129, covers the insulating filling which conceals and encapsulates the wiring within the adaptor, and extends to an exposed rim 133 of socket 130 as shown in FIG. 14.

The wiring connections between plug and socket terminals of the adaptor are based on the fact that, as will be understood by those skilled in the art, there are basically two tube basing diagrams for pentode tubes used in present day television receiver sets. These two tube basing diagrams are identical in connections with the exception that the cathode and suppressor elements are reversed. One of the two tube basing diagrams is known by the designation 7BD. An example of a pentode tube having this basing diagram is a pentode known by the designation 6AU6. The other tube basing diagram is known by the designation 7CM and an example of a pentode tube having this particular basing diagram is a pentode known by the designation 6CB6. Designations of other pentodes falling within the respective basing diagrams are known to those skilled in the art, the 6AU6 and 6CB6 designations being merely examples.

Having two tube basing diagrams means that it is necessary to provide two embodiments of the adaptor in order to go from one basing diagram as used in the particular television receiver set involved, through the adaptor, to the same basing diagram at the socket of the adaptor. However, it is also possible to go from one basing diagram as used in the particular television receiver set involved, through the adaptor, to the opposite basing diagram at the socket of the adaptor. This makes four wiring possibilities and these are illustrated in FIGS. 16–19.

Figure 19:
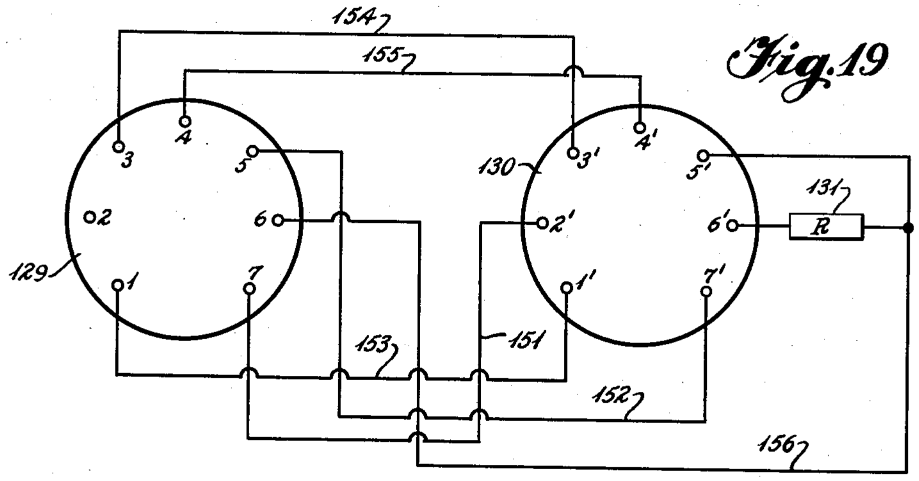
FIG. 19 is similar to FIG. 18 but having the tube basing diagrams reversed.

The wiring connections shown in FIG. 15 are based upon the wiring diagram shown in FIG. 19. However, since the FIG. 19 diagram involves going from one of the two types of basing diagrams referred to to the other type of basing diagram, it is believed that it will be easier to follow the wiring diagrams if the description is started with one wherein it goes from one basing diagram as used in the television receiver set, through the adaptor, to the same basing diagram at the socket of the adaptor.

Figure 16:
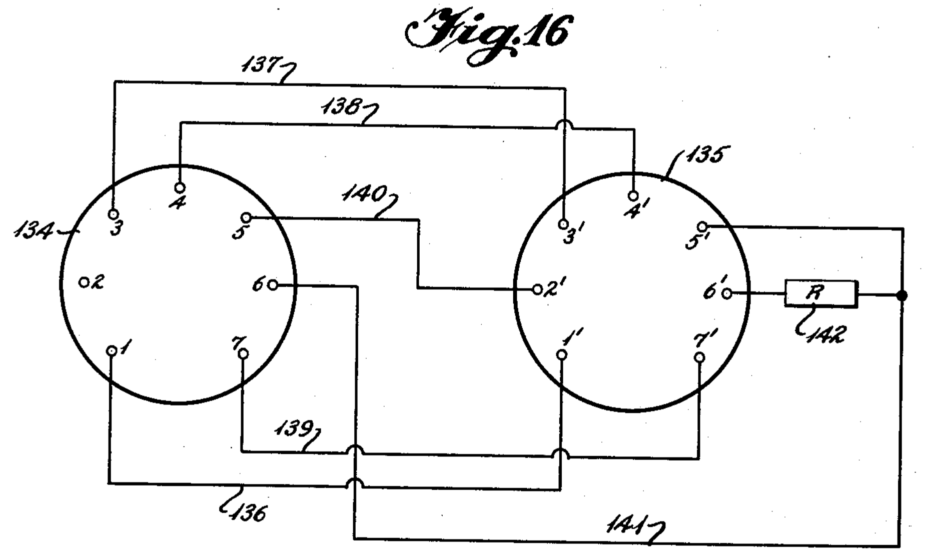
FIG. 16 is a wiring diagram of an adaptor for use in going from one type of the basing diagram in the receiver set to the same type of tube basing diagram at the socket of the adaptor.

Accordingly, reference is made to FIG. 16 which shows a wiring diagram going from a 7BD basing diagram as used in the particular television receiver set involved to the same 7BD basing diagram at the socket of the adaptor. A tube type for this particular basing diagram can be a 6AU6. That is, if the particular television receiver set has a 6AU6 pentode in the first video IF stage, for example, by removing the tube, plugging in an adaptor having the wiring diagram shown in FIG. 16, and then plugging the tube into the socket of the adaptor, the tube will then be connected as is tube 103 in FIG. 13, for example. When so connected, the internal capacities of the tube will differ from those of the tube when it functions as an ordinary pentode. At times, this necessitates minor adjustments in the receiver circuit since the IF stages are staggered and their arrangements and exact responses will vary. These minor adjustments may be made at the local oscillator, in the coupling from the tuner to the IF stages, or even in the IF stages themselves.

Referring more specifically to FIG. 16, reference numeral 134 designates the plug of the adaptor, corresponding to plug 129 shown in FIG. 15, and reference numeral 135 designates the socket of the adaptor, corresponding to socket 130 shown in FIG. 15. Plug 134 has seven pin terminals 1–7. Since it is assumed that the particular television receiver set has a type 7BD tube basing diagram or, to put it another way, that a 6AU6 pentode, for example, is used in the IF stage being converted, then the pin terminals will normally be connected to the following elements of the pentode tube:

| | |
|---|---|
| Pin terminal **1** | control grid |
| Pin terminal **2** | suppressor grid |
| Pin terminal **3** | heater |
| Pin terminal **4** | heater |
| Pin terminal **5** | plate |
| Pin terminal **6** | screen grid |
| Pin terminal **7** | cathode |

Socket terminals 1′–7′ are connected to like elements within the pentode tube (a 6AU6, for example) when the latter is plugged into the socket 135. Pin terminal 1 is connected to socket terminal 1′ by conductive lead or wire 136, pin terminal 3 is connected to socket terminal 3′ by wire 137, pin terminal 4 is connected to socket terminal 4′ by wire 138, and pin terminal 7 is connected to socket terminal 7′ by wire 139. This means that the adaptor does not change the connections of the control grid, heater, and cathode terminals so that these terminals of the particular tube involved are connected to like terminals in the receiver set.

However, pin terminal 5 of plug 134 is connected to socket terminal 2′ of socket 135. This means that the suppressor grid of the tube is connected to the plate or output terminal of this stage of the receiver set whereby the output signals come directly from the suppressor which corresponds to outer grid 113 of tube 103 shown in FIG. 13. Pin terminal 6 is connected to socket terminal 5′ by wire 141 and a resistor 142 (corresponding to resistor 131 shown in FIG. 15) is connected between socket terminal 6′ and wire 141. The plate and screen grid of the tube plugged into socket 135 are therefore connected to the screen grid terminal of the particular receiver set involved whereby they are connected to the B+ source, and a resistor is connected between the screen grid terminal of the tube and the plate terminal of the tube. Resistor 142 therefore corresponds to resistor 110 (see FIG. 13) and wire 141 thus corresponds to plate lead 111. Pin terminal 2 of plug 134 is left blank since the suppressor grid of the tube plugged into socket 135 is not connected to the suppressor grid socket terminal of the IF stage of the particular receiver set involved.

Figure 17:
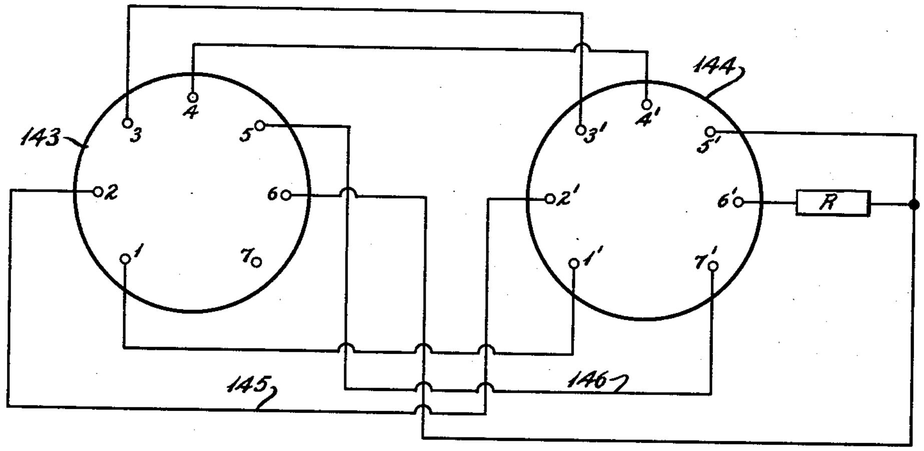
FIG. 17 is similar to FIG. 16 with the exception that the tube basing diagram is of a different type from that of FIG. 16.

The wiring diagram shown in FIG. 17 is similar to the wiring diagram shown in FIG. 16 in that, in the FIG. 17 wiring diagram, the adaptor is for use with an IF stage of a television receiver set having the same tube basing diagram as the tube basing diagram of the socket of the adaptor. In other words, like the adaptor having the FIG. 16 wiring diagram, the FIG. 17 adaptor permits the same tube to be plugged into the socket of the adaptor as was plugged directly into the IF stage of the particular television receiver set involved. However, the FIG. 17 wiring diagram applies to the other type of basic tube basing diagram mentioned above, namely, the type known by the designation 7CM.

This type 7CM tube basing diagram is identical to the other type of tube basing diagram mentioned above (type 7BD for example) with the exception that the cathode and suppressor elements are reversed. Thus, referring to plug 143 shown in FIG. 17, pin terminal 2 is the cathode terminal and pin terminal 7 is the suppressor grid terminal which is exactly opposite to these respective terminals as described in connection with plug 134 shown in FIG. 16. Socket terminal 2′ of socket 144 shown in FIG. 17 is likewise a cathode terminal and consequently it is connected to pin terminal 2 of plug 143 by wire 145. Socket terminal 7′ of socket 144 shown in FIG. 17 is connected to pin terminal 5 of plug 143 by wire 146 whereby (as in FIG. 16) the suppressor grid of a pentode tube plugged into socket 144 (such as a pentode known by the designation 6CB6) is connected to the plate or output lead of the IF stage of the particular television receiver set involved (again, as in FIG. 16). The suppressor element may actually be a cold electrode (as in a 6CB6) rather than strictly a grid. The other plug and socket terminals shown in FIG. 17, and the connections therebetween, are the same as those shown and described above in connection with FIG. 16 and, consequently, further detailed description thereof is deemed to be unnecessary.

Socket terminal 7′ (the cathode terminal) is therefore connected to pin terminal 2 of plug 147 (likewise the cathode terminal) by wire 149. Suppressor grid socket terminal 2′ of socket 148 is therefore connected to plate pin terminal 5 of plug 147 by wire 150. The other pin and socket terminals and the wires connecting them are the same as has been described above in connection with FIG. 16 and further description thereof is deemed to be unnecessary. From what has been described in connection with FIG. 18, it is evident that, by using an adaptor having a wiring diagram in accordance with FIG. 18, it is possible to plug a type 6AU6 pentode into the adaptor socket 148 and plug the adaptor into a socket of the particular television receiver set involved which is adapted to receive a type 6CB6 pentode or, for that matter, any pentode having a type 7CM tube basing diagram.

The wiring diagram shown in FIG. 19 is that of an adaptor for use in going from a type 7BD diagram in the receiver set to a type 7CM tube basing diagram at the socket of the adaptor. The structural connections shown in FIG. 15 are in accordance with the wiring diagram of FIG. 19 and the two figures should therefore be considered together.

In plug 129, pin terminal 2 is the suppressor grid terminal and pin terminal 7 is the cathode terminal. In socket 130, socket terminal 2′ is the cathode terminal and socket terminal 7′ is the suppressor grid terminal. Terminal 2′ of socket 130 is therefore connected to pin terminal 7 of plug 129 by wire 151, thus connecting the cathode of the tube plugged into socket 130 through to the cathode circuit of the IF stage of the particular receiver set involved. Suppressor grid terminal 7′ of socket 130 is connected to pin terminal 5 of plug 129 by wire 152, thus connecting the suppressor grid (outer grid) of the tube plugged into socket 130 through to the plate or output circuit of the IF stage of the particular receiver set involved.

The respective plug and socket control grid terminals 1 and 1′ are connected by wire 153, and the respective plug and socket heater terminals 3—3′ and 4—4′ are connected by wires 154 and 155. Socket terminal 5′ (the plate terminal) is connected to pin terminal 6 of plug 129 (the screen grid terminal) by wire 156, and resistor 131 is connected between socket terminal 6′ (the screen or middle grid terminal) and plate terminal 5′. Thus, both the plate and the screen grid of the tube plugged into socket 130 are connected through to the B+ source of the IF stage of the particular television receiver set involved. FIG. 15 shows the structural wiring connections in accordance with the diagram of FIG. 19.

From the foregoing description in connection with FIGS. 14–19, it is evident that there may be four embodiments of an adaptor in accordance with the teaching of the present invention. Having four embodiments provides for extreme flexibility of adapting an IF stage of the great majority of conventional television receiver sets to incorporate circuit connections such as those shown for tube 103 in FIG. 13. In other words, for a great variety of available pentode tubes having either a type 7BD or a type 7CM tube basing diagram, it is possible to convert the circuit connections associated with the tube so that one side of the output circuit from the tube comes directly from the suppressor or outer grid of the tube as shown in FIG. 13. Moreover, the plate, the middle grid (screen grid), and the outer grid (suppressor grid) of the tube plugged into the adaptor socket all act as output elements as has been described above in relation to FIGS. 1 and 2, for example.

Adaptors in accordance with the present invention may be used at frequencies up to 41 megacycles and while, with the adaptor, the gain of the converted IF stage is less than that with normal pentode operation, it is still found that the picture at the picture tube is sharp, clear, and has an apparent illusion of depth as compared to operation of the receiver set without the adaptor. Where the receiver is of the intercarrier type, the improvement obtained in video output is accompanied by improvement in the sound output since the sound signals are also amplified through the composite or video IF stages. In other words, the sound is clear and brilliant with improved fullness in the base region of frequencies. It is evident that the adaptor is an inexpensive and practical means for achieving such picture and sound improvement.

While I have described adaptors for use particularly in video IF stages, I have found that adaptors according to my invention work equally well in IF stages of lower frequencies such as AM radio IF stages. In many audio amplifiers which include pentode stages, an adaptor according to the present invention, connected with appropriate impedance elements, will function satisfactorily to convert the stage involved so that it has circuit connections of an amplifier according to the teaching of the present invention.

It is therefore seen that amplifier circuits in accordance with the teaching of the present invention are useful both in audio and video applications and provide substantially distortionless amplification in both such applications. It is believed that the reason for this is that the electron fields within the tube interact with each other to produce a resultant field or fields having a depth factor. In other words, where a single tube provides in effect a plurality of amplifiers having electron fields of substantially equal intensity, these fields being considered in conjunction with the various impedance paths which are reactive at various frequencies used in amplification, it can be considered that these fields would plot vectorially their instantaneous values for any frequency or combination of frequencies. This would result in a dynamic field which would plot separated wave forms and, with the time element being considered, would result in a different type of energy characteristic.

Possibly, electron fields created by the middle grid, outer grid and plate interact with each other to produce a resultant helical field or one having a dynamic motion. Since the outer grid is preferably located physically between the middle grid, it does, so to speak, extract the output information from the center of fields created by these elements and, with the middle grid and plate being considered as being in effect twin anodes, serves as a virtual midtap of the anode. In any event, I have found by actual usage that amplifier circuits in accordance with my invention, particularly the circuit shown in FIG. 2, provide improved reproduction in both audio and video applications, with capacitor 21 being omitted in video applications. The reproduced information is substantially free from distortion and has a depth of quality which is readily distinguishable both by ear in the case of audio, and by eye in the case of video.

Amplifiers in accordance with the teaching of the present invention may be compensated for any practicable input range of frequencies so that the desired output range can be effected. As will be appreciated by those skilled in the art, such compensation can be achieved by known means of frequency compensation and can be applied to individual elements of the amplifier separately or to several such elements. Further, while I have used resistors primarily as the impedance elements in my amplifier circuits (in audio applications, for example), it will be appreciated that the impedance means may be inductances particularly where radio frequency applications are involved.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

I claim:

1. An electrical amplifier circuit comprising a tube having an anode electrode, a cathode electrode, a plurality of separate control grids located between said anode electrode and said cathode electrode, a middle electrode having a portion located between the control grid closest to said cathode electrode and said anode electrode, an outer electrode having a portion located between said middle electrode and said anode electrode, a plurality of input circuits each including one of said control grids and said cathode electrode, respectively, an output circuit including said middle electrode, outer electrode, anode electrode and cathode electrode, means connected to said middle electrode, said outer electrode, and said anode electrode to apply a positive electrical potential to said middle electrode, said outer electrode and said anode electrode, whereby said middle electrode, said outer electrode and anode electrode each function as substantially independent output elements of said amplifier.

2. A multiple stage electrical amplifier circuit comprising first stage including a tube having an anode electrode, a cathode electrode, a control grid having a portion located between said anode electrode and said cathode electrode, a middle grid having a portion located between said control grid and said anode electrode, and an outer grid having a portion located between said middle grid and said anode electrode, an input circuit including said control grid and said cathode electrode, means for connecting a source of audio input signals to said input circuit, an output circuit including said middle grid, outer grid, anode electrode and cathode electrode, means connected to said middle grid, said outer grid, and said anode electrode to apply a positive electrical potential to said middle grid, said outer grid and said anode electrode including a lead connected to said outer grid and extending therefrom to form one side of the output circuit of the first stage, whereby said middle grid, said outer grid and said anode electrode each function as an output element of said first stage, a tone compensating capacitor connected between the anode electrode of the tube in said first stage and the lead which forms one side of the output circuit of said first stage; a succeeding stage having an input circuit, and means electrically connecting the input circuit of the succeeding stage to said lead.

3. A multiple stage electrical amplifier circuit according to claim 2 including a load impedance which is common to both the middle grid and the anode electrode of the tube in said first stage.

4. An electrical amplifier comprising a tube having a control electrode, a cathode electrode, an output anode electrode and a pair of intermediate output electrodes arranged with one of said intermediate output electrodes being between the other two of said output electrodes, means for applying a bias potential to said control element and cathode electrode, a source of positive potential, means for applying said positive potential to one of said intermediate output electrodes, including a load impedance for said one output electrode, a common load impedance for the others of said output electrodes, means for applying said positive potential through said common load impedance to the others of said output electrodes, an impedance element between one of said other output electrodes and said common load impedance, and a lead connected directly to one of said intermediate output electrodes, said lead forming one side of an output circuit for said amplifier.

5. An electrical amplifier according to claim 4 including a capacitance connected between said output anode electrode and said output lead.

6. An electrical amplifier according to claim 4 including a capacitance connected between said output anode electrode and the intermediate output electrode closest thereto.

7. An electrical amplifier comprising a tube having an anode electrode, a cathode electrode, and a control grid, a middle electrode, and an outer electrode located between said cathode electrode and said anode electrode with said control grid being closest to said cathode electrode and said outer electrode being closest to said anode electrode, an input circuit including said control grid and said cathode electrode, means connected to said input circuit to apply a bias electrical potential to both said control grid and said cathode electrode, means connected to said middle electrode, said outer electrode and said anode electrode to apply a positive electrical potential to said middle electrode, said outer electrode and said anode electrode, said last mentioned means including a common load impedance for said middle electrode and said anode electrode, an impedance connected between said middle electrode and said common load impedance, a load impedance connected to said outer electrode and a lead connected to said outer electrode and extending directly therefrom to form one side of said output circuit.

8. An electrical amplifier according to claim 7 including a capacitor connected electrically across said outer electrode and said anode electrode.

References Cited in the file of this patent

UNITED STATES PATENTS

| | | |
|---|---|---|
| 1,966,221 | Rinia | July 10, 1934 |
| 2,089,785 | Sabloniere | Aug. 10, 1937 |
| 2,212,215 | Tamm | Aug. 20, 1940 |
| 2,217,275 | Herold | Oct. 8, 1940 |
| 2,273,107 | Herold | Feb. 17, 1942 |
| 2,416,334 | Levy | Feb. 25, 1947 |
| 2,597,629 | Foster | May 20, 1952 |
| 2,621,264 | Hultberg | Dec. 9, 1952 |
| 2,661,457 | Boast | Dec. 1, 1953 |
| 2,714,194 | Beynink | July 26, 1955 |
| 2,860,314 | Daniels et al. | Nov. 11, 1958 |